United States Patent
Uneura et al.

(10) Patent No.: US 11,434,783 B2
(45) Date of Patent: Sep. 6, 2022

(54) BEARING STRUCTURE INCLUDING A ROTATION MEMBER WITH A PLURALITY OF EXTENDED PORTIONS AND A BEARING MEMBER HAVING A PLURALITY OF MAIN BODIES EACH INCLUDING A COUNTERFACE SURFACE FACING ONE OF THE PLURALITY OF EXTENDED PORTIONS IN AN AXIAL DIRECTION

(71) Applicant: IHI Corporation, Tokyo (JP)

(72) Inventors: Yutaka Uneura, Tokyo (JP); Jaemin Huh, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 17/142,311

(22) Filed: Jan. 6, 2021

(65) Prior Publication Data

US 2021/0123360 A1 Apr. 29, 2021

Related U.S. Application Data

(63) Continuation of application No. PCT/JP2019/031719, filed on Aug. 9, 2019.

(30) Foreign Application Priority Data

Oct. 5, 2018 (JP) .............................. JP2018-190453

(51) Int. Cl.
  *F01D 25/16* (2006.01)
  *F01D 17/10* (2006.01)
  (Continued)

(52) U.S. Cl.
  CPC ......... *F01D 25/168* (2013.01); *F01D 17/105* (2013.01); *F02B 37/18* (2013.01);
  (Continued)

(58) Field of Classification Search
  CPC ..... F02B 37/18–186; F01D 17/10–105; F01D 25/166–168; F16C 17/04; F16C 17/047; F16C 23/048
  See application file for complete search history.

(56) References Cited

U.S. PATENT DOCUMENTS

2005/0079049 A1   4/2005   Ishihara et al.
2010/0089055 A1   4/2010   Severin
(Continued)

FOREIGN PATENT DOCUMENTS

CN   103237992 A   8/2013
CN   104271919 A   1/2015
(Continued)

OTHER PUBLICATIONS

International Search Report dated Sep. 10, 2019 in PCT/JP2019/031719 filed on Aug. 9, 2019 (with English Translation), 4 pages.
(Continued)

*Primary Examiner* — Laert Dounis

(57) ABSTRACT

A bearing structure includes: a rotation member including a plurality of extended portions extending radially outward from a shaft portion and arranged separated away from each other in an axial direction of the shaft portion; and a bearing member in which a counterface surface facing one of the plurality of extended portions in the axial direction is included in one or a plurality of main bodies.

18 Claims, 16 Drawing Sheets

(51) Int. Cl.
*F02B 37/18* (2006.01)
*F16C 17/04* (2006.01)
*F16C 23/04* (2006.01)

(52) U.S. Cl.
CPC ............ *F02B 37/186* (2013.01); *F16C 17/04* (2013.01); *F16C 23/048* (2013.01); *F05D 2220/40* (2013.01); *F05D 2240/50* (2013.01); *F05D 2240/60* (2013.01); *F05D 2260/606* (2013.01)

(56) References Cited

U.S. PATENT DOCUMENTS

| 2013/0089411 A1* | 4/2013 | Ward .................. F04D 27/002 415/151 |
| 2015/0097345 A1 | 4/2015 | House et al. |
| 2015/0292562 A1 | 10/2015 | Maeda |
| 2017/0074114 A1 | 3/2017 | Isono et al. |

FOREIGN PATENT DOCUMENTS

| CN | 104685183 A | 6/2015 |
| CN | 106150675 A | 11/2016 |
| CN | 107429735 A | 12/2017 |
| EP | 2 253 816 A1 | 11/2010 |
| JP | 02-030926 A | 2/1990 |
| JP | 2000-136886 A | 5/2000 |
| JP | 2004-278793 A | 10/2004 |
| JP | 2005-113797 A | 4/2005 |
| JP | 2005-351089 A | 12/2005 |
| JP | 2008-019798 A | 1/2008 |
| JP | 2013-130133 A | 7/2013 |
| JP | 2013-530337 A | 7/2013 |
| JP | 2015-129520 A | 7/2015 |
| JP | 2016-11640 A | 1/2016 |
| JP | 2016-186241 A | 10/2016 |
| ME | 2008-309111 A | 12/2008 |
| WO | WO 2004/053299 A1 | 6/2004 |
| WO | WO 2014/069109 A1 | 5/2014 |
| WO | WO 2015/190362 A1 | 12/2015 |
| WO | WO 2017/212805 A1 | 12/2017 |

OTHER PUBLICATIONS

Japanese Office Action dated Dec. 14, 2021 in Japanese Patent Application No. 2020-549999, 3 pages.

Combined Chinese Office Action and Search Report dated Dec. 31, 2021 in Chinese Patent Application No. 201980046687.3 (with English translation of Categories of Cited Documents), 8 pages.

\* cited by examiner

BEARING STRUCTURE INCLUDING A ROTATION MEMBER WITH A PLURALITY OF EXTENDED PORTIONS AND A BEARING MEMBER HAVING A PLURALITY OF MAIN BODIES EACH INCLUDING A COUNTERFACE SURFACE FACING ONE OF THE PLURALITY OF EXTENDED PORTIONS IN AN AXIAL DIRECTION

CROSS REFERENCE TO RELATED APPLICATIONS

This application is a continuation application of International Application No. PCT/JP2019/031719, filed on Aug. 9, 2019, which claims priority to Japanese Patent Application No. 2018-190453, filed on Oct. 5, 2018, the entire contents of which are incorporated by reference herein.

BACKGROUND ART

Technical Field

The present disclosure relates to a bearing structure.

Related Art

Patent Literature 1 discloses an exhaust gas seal structure of a turbine housing. The exhaust gas seal structure includes a turbine housing, a bearing member, a shaft, and a seal member. The bearing member is included in the turbine housing. The bearing member supports the shaft in a freely rotatable manner. The bearing member has an end surface orthogonal to the axial direction of the shaft. The shaft has a bearing surface that faces the end surface of the bearing member. The seal member includes a spring member. The spring member urges the bearing member toward a direction in which the end surface of the bearing member is pressed against the bearing surface of the shaft.

CITATION LIST

Patent Literature

Patent Literature 1: JP 2013-130133 A

SUMMARY

Technical Problem

Exhaust gas having a high temperature greater than or equal to 500° C. flows in the turbine housing. Therefore, the spring member is arranged in a high temperature environment greater than or equal to 500° C. The spring member may undergo permanent set-in fatigue due to the high temperature when arranged in a high temperature environment. In that case, the spring member has less urging force for presses the end surface of the bearing member against the bearing surface of the shaft. When the urging force of the spring member is reduced, exhaust gas may leak out of the turbine housing through a gap between the shaft and the bearing member.

An object of the present disclosure is to provide a bearing structure capable of suppressing leakage of exhaust gas.

Solution to Problem

In order to solve the above disadvantage, a bearing structure of the present disclosure includes: a rotation member including a shaft portion and a plurality of extended portions extending radially outward from the shaft portion and arranged separated away from each other in an axial direction of the shaft portion; a bearing member including one or a plurality of main bodies through which the shaft portion is inserted, the one or the plurality of main bodies including a counterface surface facing one of the plurality of extended portions in the axial direction; and a turbine housing in which a through hole is formed, the through hole in which the bearing member is arranged.

The rotation member may include a pair of extended portions arranged so as to face each other in the axial direction.

The bearing member may include the main body located between a pair of the extended portions arranged so as to face each other in the axial direction, the main body including a pair of counterface surfaces facing the pair of extended portions, respectively.

The bearing member may include a pair of counterface surfaces arranged so as to face each other in the axial direction.

The rotation member may include a large diameter portion having a diameter larger than a diameter of the shaft portion and including the extended portion on each of one side and another side in the axial direction, and the bearing member includes a plurality of the main bodies including the counterface surface and arranged on each of one side and another side in the axial direction with respect to the large diameter portion.

The bearing member may include the main body arranged so as to be movable in the axial direction and the main body whose movement in the axial direction is restricted.

The bearing member may include a main body including a plurality of members divided in the axial direction.

Effects of Disclosure

According to the present disclosure, leakage of exhaust gas can be suppressed.

DESCRIPTION OF EMBODIMENTS

An embodiment of the present disclosure will be described below with reference to the accompanying drawings. Dimensions, materials, other specific numerical values, and the like illustrated in embodiments are merely examples for facilitating understanding, and the present disclosure is not limited thereby unless otherwise specified. Note that, in the present specification and the drawings, components having substantially the same function and structure are denoted by the same symbol, and redundant explanations are omitted. Illustration of components not directly related to the present disclosure is omitted.

Figure 1:
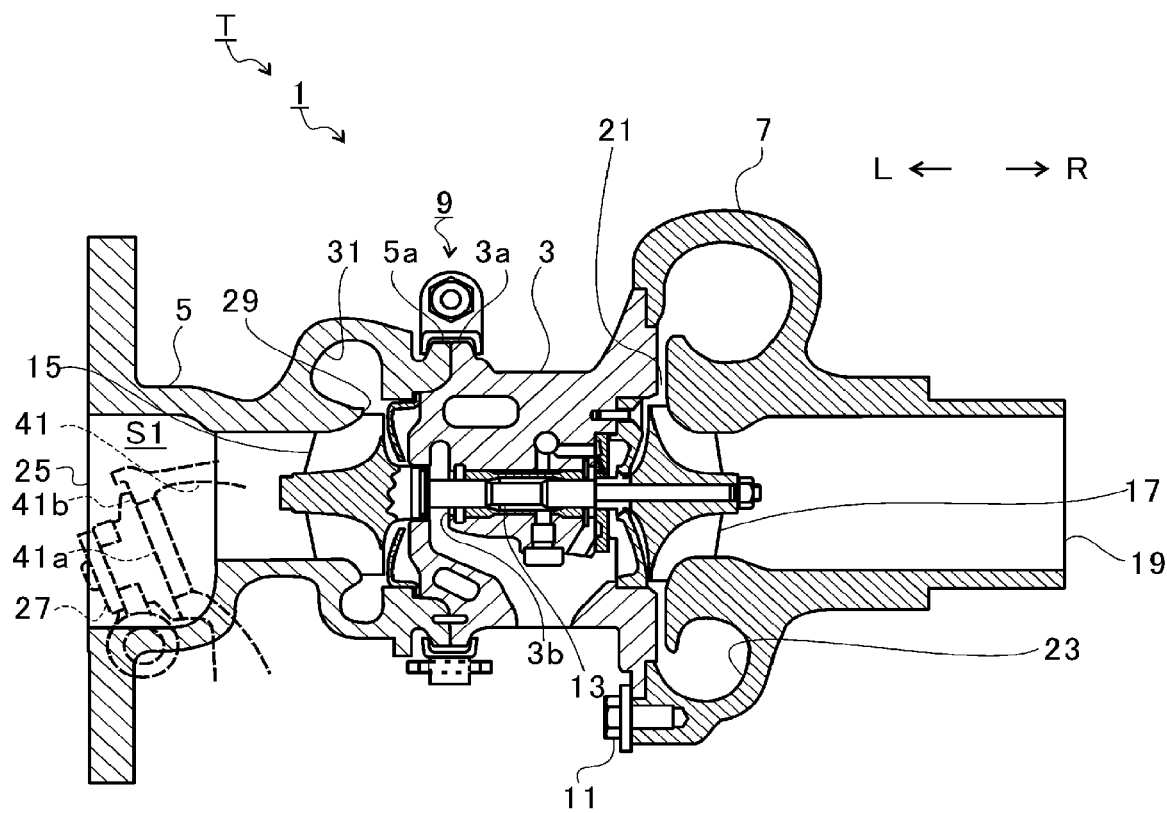
FIG. 1 is a schematic cross-sectional view of a turbocharger.

FIG. 1 is a schematic cross-sectional view of a turbocharger T. Hereinafter, description is given assuming that a direction of arrow L illustrated in FIG. 1 is the left side of the turbocharger T. Description is given assuming that a direction of arrow R illustrated in FIG. 1 is the right side of the turbocharger T. As illustrated in FIG. 1, the turbocharger T includes a turbocharger main body 1. The turbocharger main body 1 includes a bearing housing 3, a turbine housing 5, and a compressor housing 7. The turbine housing 5 is coupled to the left side of the bearing housing 3 by a fastening mechanism 9. The compressor housing 7 is coupled to the right side of the bearing housing 3 by a fastening bolt 11.

A protrusion 3a is formed on the outer curved surface of the bearing housing 3. The protrusion 3a is formed closer to the turbine housing 5. The protrusion 3a protrudes in a radial direction of the bearing housing 3. A protrusion 5a is formed on the outer curved surface of the turbine housing 5. The protrusion 5a is formed closer to the bearing housing 3. The protrusion 5a protrudes in a radial direction of the turbine housing 5. The bearing housing 3 and the turbine housing 5 are fastened to each other by a band by the fastening mechanism 9. The fastening mechanism 9 includes, for example, a G coupling. The fastening mechanism 9 clamps the protrusions 3a and 5a.

A rotary shaft hole 3b is formed in the bearing housing 3. The rotary shaft hole 3b penetrates through the turbocharger T in the left and right direction. The rotary shaft hole 3b pivotally supports a rotary shaft 13 via a sliding bearing. A turbine impeller 15 is provided at the left end of the rotary shaft 13. The turbine impeller 15 is accommodated in the turbine housing 5 in a freely rotatable manner. A compressor impeller 17 is provided at the right end of the rotary shaft 13. The compressor impeller 17 is accommodated in the compressor housing 7 in a freely rotatable manner.

An intake port 19 is formed in the compressor housing 7. The intake port 19 opens to the right side of the turbocharger T. The intake port 19 is coupled to an air cleaner (not illustrated). The counterface surfaces of the bearing housing 3 and the compressor housing 7 form a diffuser flow passage 21. The diffuser flow passage 21 pressurizes the air. The diffuser flow passage 21 is formed in an annular shape. The diffuser flow passage 21 communicates with the intake port 19 via the compressor impeller 17 on the inner side in the radial direction.

A compressor scroll flow passage 23 is formed in the compressor housing 7. The compressor scroll flow passage 23 is formed in an annular shape. The compressor scroll flow passage 23 is positioned on an outer side in the radial direction of the rotary shaft 13 with respect to the diffuser flow passage 21. The compressor scroll flow passage 23 communicates with an intake port of an engine (not illustrated) and the diffuser flow passage 21. When the compressor impeller 17 rotates, the air is sucked from the intake port 19 into the compressor housing 7. The sucked air is pressurized and accelerated in the process of flowing through blades of the compressor impeller 17. The pressurized and accelerated air is pressurized by the diffuser flow passage 21 and the compressor scroll flow passage 23. The pressurized air is guided to the intake port of the engine.

A discharge port 25 is formed in the turbine housing 5. The discharge port 25 opens to the left side of the turbocharger T. The discharge port 25 is coupled to an exhaust gas purification device (not illustrated). The turbine housing 5 has an internal space S1 formed therein on the discharge port 25 side. A valve 27, which will be described later, is arranged in the internal space S1. A communication passage 29 and a turbine scroll flow passage 31 are formed in the turbine housing 5. The turbine scroll flow passage 31 is formed in an annular shape. The turbine scroll flow passage 31 is positioned, for example, on an outer side in the radial direction of the turbine impeller 15 with respect to the communication passage 29. The turbine scroll flow passage 31 communicates with a gas inlet port 33 (see FIG. 2). Exhaust gas discharged from an exhaust manifold of the engine (not illustrated) is guided to the gas inlet port 33. The communication passage 29 communicates the turbine scroll flow passage 31 with the discharge port 25 via the turbine impeller 15. The exhaust gas guided from the gas inlet port 33 to the turbine scroll flow passage 31 is guided to the discharge port 25 via the communication passage 29, the turbine impeller 15, and the internal space S1. The exhaust gas guided to the discharge port 25 rotates the turbine impeller 15 in the process of flowing therethrough.

The turning force of the turbine impeller 15 is transmitted to the compressor impeller 17 via the rotary shaft 13. When the compressor impeller 17 rotates, the air is pressurized as described above. In this manner, the air is guided to the intake port of the engine.

Figure 2:
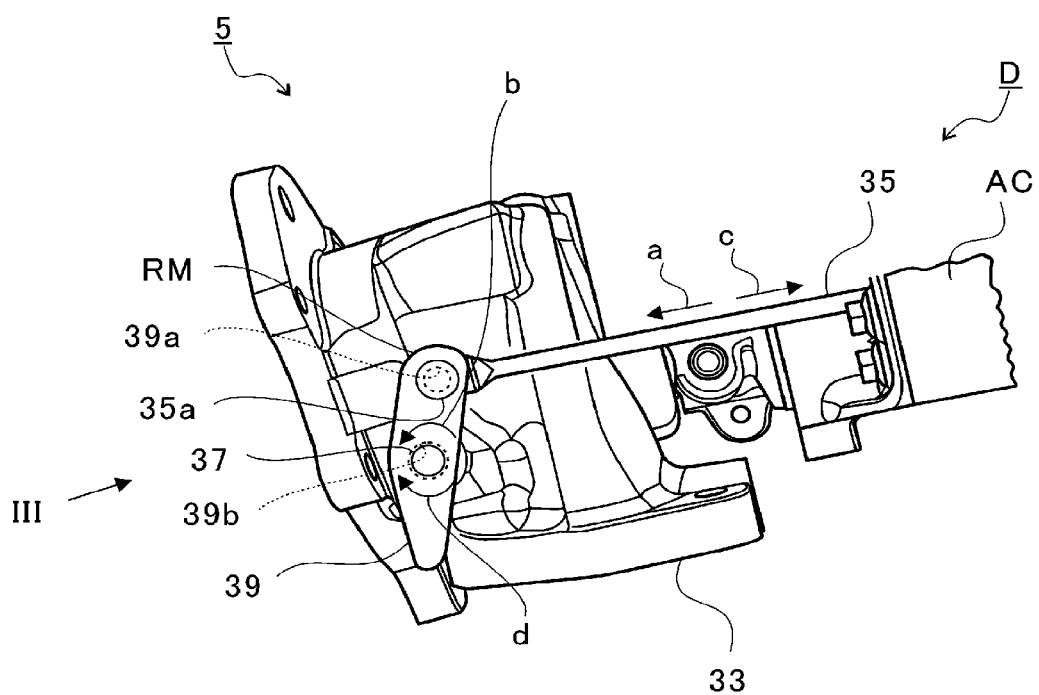
FIG. 2 is an external view of a turbine housing.

FIG. 2 is an external view of the turbine housing 5. As illustrated in FIG. 2, a driving mechanism D is arranged outside the turbine housing 5. The driving mechanism D includes an actuator rod 35 and an actuator AC. One end of the actuator rod 35 is coupled to the actuator AC, and the other end is coupled to a rotation member RM. The actuator AC moves the actuator rod 35 in the axial direction of the actuator rod 35 (in the directions of arrows a and c in FIG. 2).

The rotation member RM includes a shaft 37 and a link plate 39. One end of the shaft 37 is arranged in the internal space S1 of the turbine housing 5, and the other end is arranged outside the turbine housing 5. The link plate 39 is a plate member and is provided outside the turbine housing 5. A rod hole 39a and a shaft hole 39b are formed in the link plate 39. The rod hole 39a and the shaft hole 39b are through holes that penetrate the link plate 39 in the plate thickness direction. The shaft hole 39b is formed in the central part of the link plate 39. The rod hole 39a is formed at an end part separated from the central part of the link plate 39.

The actuator rod 35 is provided with a pin rod 35a. The pin rod 35a is provided at an end of the actuator rod 35 that is opposite to the end coupled to the actuator AC. The pin rod 35a is inserted into the rod hole 39a of the link plate 39 in a freely rotatable manner. An end of the shaft 37, which is arranged outside the turbine housing 5, is inserted into the shaft hole 39b of the link plate 39 in a non-rotatable manner.

The shaft 37 is, for example, welded to the link plate 39. The shaft 37 rotates integrally with the link plate 39.

When the actuator AC is driven, the actuator rod 35 moves in the direction of arrow a or arrow c in FIG. 2. When the actuator rod 35 moves in the direction of arrow a in FIG. 2, the link plate 39 rotates in the direction of arrow b in FIG. 2 with the rotation axis of the shaft 37 as the center. When the actuator rod 35 moves in the direction of arrow c in FIG. 2, the link plate 39 rotates in the direction of arrow d in FIG. 2 with the rotation axis of the shaft 37 as the center.

As illustrated in FIG. 2, the gas inlet port 33 opens substantially downward in the turbine housing 5 in FIG. 2. The gas inlet port 33 communicates with the turbine scroll flow passage 31 (see FIG. 1). A bypass flow path 41 (see FIG. 1) is formed in the turbine housing 5. The bypass flow path 41 communicates the turbine scroll flow passage 31 with the internal space S1 (see FIG. 1). The exhaust gas flowing into the gas inlet port 33 branches into exhaust gas flowing through the turbine scroll flow passage 31 and exhaust gas flowing through the bypass flow path 41. The bypass flow path 41 guides a part of the exhaust gas flowing through the turbine scroll flow passage 31 to the internal space S1 by bypassing the turbine impeller 15 (see FIG. 1).

As illustrated in FIG. 1, an outlet end 41a of the bypass flow path 41 opens on the wall surface forming the internal space S1 in the turbine housing 5. The outlet end 41a is formed on the downstream side of the turbine impeller 15. The outlet end 41a communicates the bypass flow path 41 with the internal space S1 on the downstream side of the turbine impeller 15.

Figure 3:
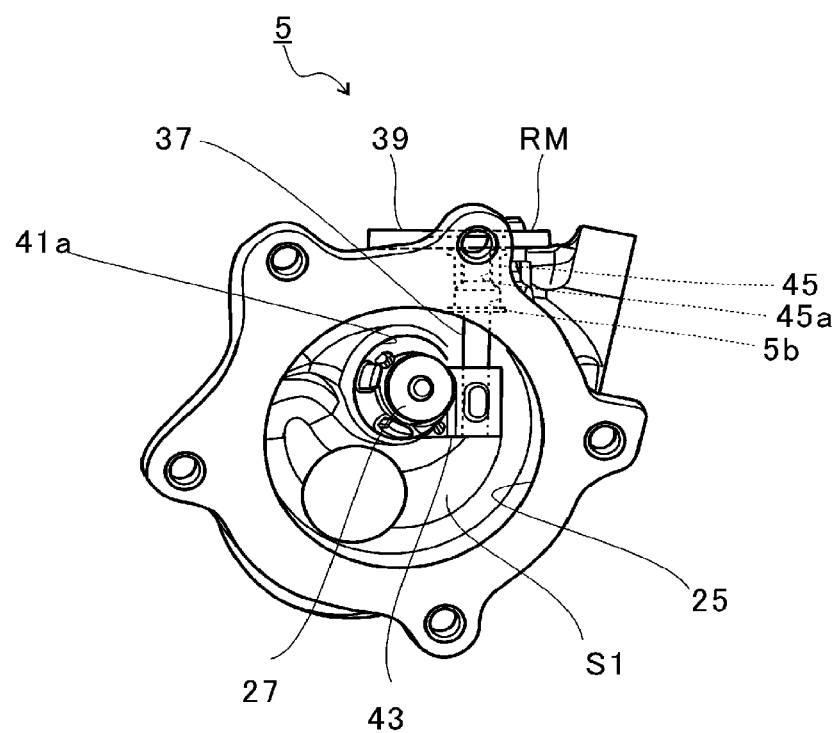
FIG. 3 is an arrow view taken along line III of FIG. 2.

FIG. 3 is an arrow view taken along line III of FIG. 2. A valve (wastegate valve) 27, an attachment plate 43, and the end of the shaft 37 are arranged in the internal space S1 of the turbine housing 5. The valve 27 is a valve body having an outer diameter larger than the inner diameter of the outlet end 41a. One end of the attachment plate 43 is coupled to the shaft 37, and the other end is coupled to the valve 27. The details of the coupling structure between the valve 27 and the attachment plate 43 will be described later. The valve 27 and the attachment plate 43 rotate integrally with the shaft 37.

The valve 27 opens and closes the outlet end 41a of the bypass flow path 41 by rotating integrally with the shaft 37. The valve 27 closes the outlet end 41a of the bypass flow path 41 when abutting against a seat surface 41b (see FIG. 1) formed around the outlet end 41a of the bypass flow path 41. The valve 27 opens the outlet end 41a of the bypass flow path 41 when separated from the seat surface 41b.

As illustrated in FIG. 3, a shaft hole 5b is formed in the turbine housing 5. The shaft hole 5b is a through hole extending in the axial direction of the shaft 37 (hereinafter, also simply referred to as the axial direction). The shaft hole 5b communicates the outside of the turbine housing 5 with the internal space S1 of the turbine housing 5. A part of the shaft 37 and a bearing member 45 are arranged in the shaft hole 5b.

The bearing member 45 has a cylindrical shape. The bearing member 45 has a bearing hole 45a on the inner curved surface side. The shaft 37 is inserted through the bearing hole 45a. One end of the bearing member 45 is arranged in the shaft hole 5b, and the other end is arranged outside the turbine housing 5. The bearing member 45 pivotally supports the shaft 37 in a freely rotatable manner. The details of the bearing structure for pivotally supporting the shaft 37 will be described later.

Figure 4:
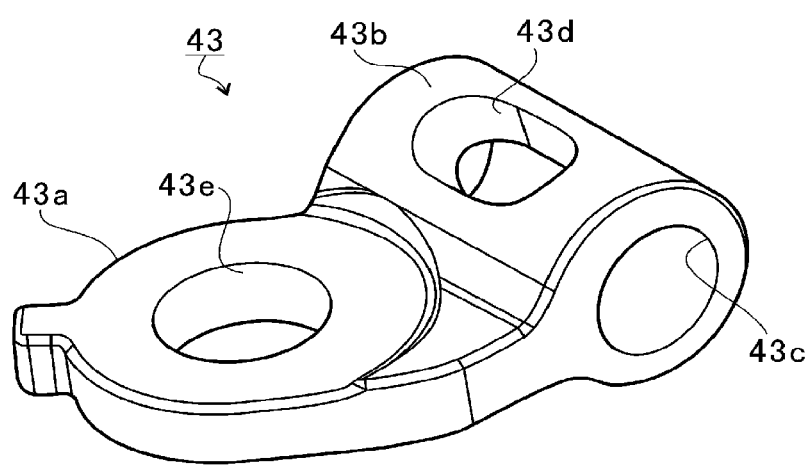
FIG. 4 is a perspective view of an attachment plate.
Figure 5:
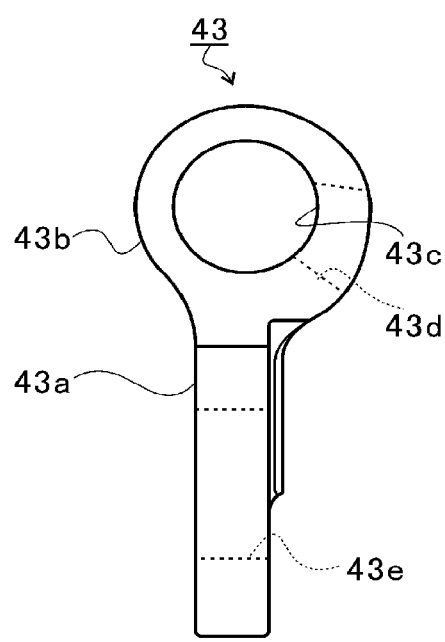
FIG. 5 is a side view of the attachment plate.
Figure 6:
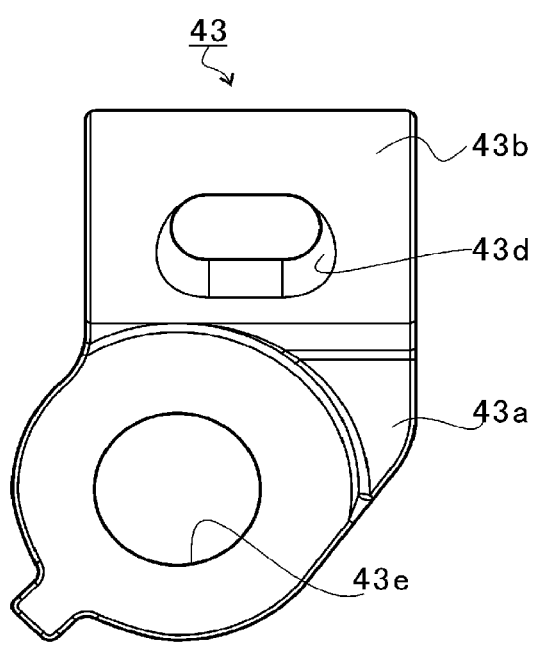
FIG. 6 is a top view of the attachment plate.

FIG. 4 is a perspective view of the attachment plate 43. FIG. 5 is a side view of the attachment plate 43. FIG. 6 is a top view of the attachment plate 43. As illustrated in FIG. 4, the attachment plate 43 includes a main body 43a and a cylindrical portion 43b. The main body 43a has an annular shape. The cylindrical portion 43b is coupled to the outer curved portion of the main body 43a. The cylindrical portion 43b has a cylindrical shape. An insertion hole 43c is formed in the cylindrical portion 43b on the inner curved surface side. The shaft 37 is inserted through the insertion hole 43c.

An exposure hole 43d is formed in the cylindrical portion 43b. The exposure hole 43d is a through hole that penetrates through the cylindrical portion 43b in the radial direction. The cylindrical portion 43b exposes a part of the shaft 37 from the exposure hole 43d when the shaft 37 is inserted into the insertion hole 43c. The shaft 37 is welded to the cylindrical portion 43b, for example, through the exposure hole 43d. The shaft 37 is attached to the attachment plate 43 by being welded to the cylindrical portion 43b.

A main body hole 43e is formed in the main body 43a on the inner curved surface side. The main body hole 43e is a through hole that penetrates the main body 43a in a direction perpendicular to the central axis of the insertion hole 43c. A part of the valve 27 is inserted into the main body hole 43e.

Figure 7:
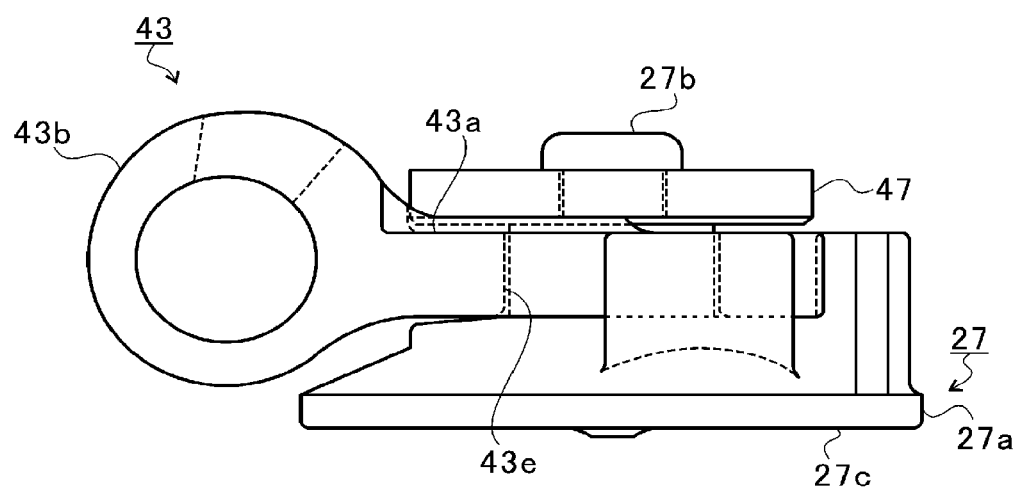
FIG. 7 is an explanatory diagram for explaining a coupling structure between a valve and the attachment plate.

FIG. 7 is an explanatory diagram for explaining the coupling structure between the valve 27 and the attachment plate 43. As illustrated in FIG. 7, the valve 27 includes a main body 27a and a protrusion 27b. The main body 27a has a contact surface 27c. The contact surface 27c can be in contact with the seat surface 41b (see FIG. 1) formed around the outlet end 41a (see FIG. 1). The protrusion 27b is formed on a side opposite to the side on which the contact surface 27c of the main body 27a is formed. The protrusion 27b extends in a direction perpendicular to the surface direction of the contact surface 27c. Note that the protrusion 27b may be integrally formed with the main body 27a or may be formed of a separate member.

As illustrated in FIG. 7, the protrusion 27b is inserted through the main body hole 43e of the attachment plate 43. The protrusion 27b is inserted through a washer 47. The attachment plate 43 is sandwiched between the main body 27a of the valve 27 and the washer 47. The tip of the protrusion 27b protruding from the washer 47 is pressure-deformed in a state where the attachment plate 43 is sandwiched between the main body 27a and the washer 47. The valve 27 is attached to the attachment plate 43 by the tip of the protrusion 27b that is pressured and thereby deformed.

Figure 8:
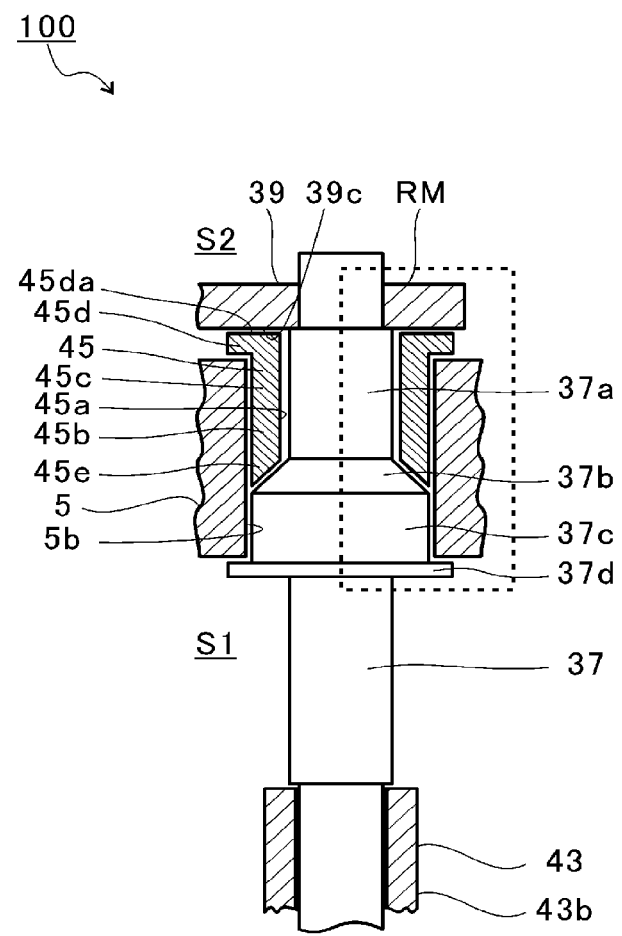
FIG. 8 is an explanatory diagram for explaining the structure of a bearing structure of the present embodiment.

FIG. 8 is an explanatory diagram for explaining the structure of the bearing structure 100 of the present embodiment. The bearing structure 100 includes the turbine housing 5, the rotation member RM (link plate 39 and shaft 37), and the bearing member 45. The shaft hole 5b of the turbine housing 5 houses a part of the shaft 37 and the bearing member 45. The shaft hole 5b has a round cross section orthogonal to the axial direction and has a constant inner diameter.

In FIG. 8, the area below the turbine housing 5 represents the inside of the turbine housing 5 (internal space S1). In FIG. 8, the area above the turbine housing 5 represents the outside of the turbine housing 5 (external space S2). In the present embodiment, an upward direction in FIG. 8 corresponds to an upward direction in the vertical direction when the turbocharger T is installed, and a downward direction in FIG. 8 corresponds to a downward direction in the vertical direction when the turbocharger T is installed.

As illustrated in FIG. 8, the shaft 37 includes a small diameter portion (shaft portion) 37a, a tapered portion (extended portion) 37b, a large diameter portion 37c, and a flange 37d. The small diameter portion 37a has a cylindrical shape. One end of the small diameter portion 37a is coupled to the link plate 39, and the other end is continuous with the tapered portion 37b. The small diameter portion 37a has a constant outer diameter. The outer diameter of the small diameter portion 37a is smaller than the inner diameter of the bearing hole 45a of the bearing member 45.

The tapered portion 37b has a truncated cone shape. One end of the tapered portion 37b is continuous with the small diameter portion 37a, and the other end is continuous with the large diameter portion 37c. The tapered portion 37b has an outer diameter that gradually increases from the small diameter portion 37a toward the large diameter portion 37c. The smallest outer diameter of the tapered portion 37b is approximately equal to the outer diameter of the small diameter portion 37a. That is, the smallest outer diameter of the tapered portion 37b is smaller than the inner diameter of the bearing hole 45a of the bearing member 45. The largest outer diameter of the tapered portion 37b is larger than the inner diameter of the bearing hole 45a of the bearing member 45.

Here, the outer curved surface of the tapered portion 37b has a linear cross section including the central axis of the shaft 37. However, without being limited thereto, the cross section of the outer curved surface of the tapered portion 37b including the central axis of the shaft 37 may have a curved shape, an arc shape, a stepped shape, or a wavy shape.

The large diameter portion 37c has a cylindrical shape. One end of the large diameter portion 37c is continuous with the tapered portion 37b, and the other end is continuous with the flange 37d. The large diameter portion 37c has a constant outer diameter. The outer diameter of the large diameter portion 37c is approximately equal to the largest outer diameter of the tapered portion 37b. The outer diameter of the large diameter portion 37c is larger than the outer diameter of the small diameter portion 37a. The outer diameter of the large diameter portion 37c is smaller than the inner diameter of the shaft hole 5b of the turbine housing 5.

The flange 37d has a cylindrical shape. The flange 37d is continuous with the large diameter portion 37c. The flange 37d is arranged in the internal space S1 of the turbine housing 5. The flange 37d has a constant outer diameter. The outer diameter of the flange 37d is larger than the outer diameter of the large diameter portion 37c. The outer diameter of the flange 37d is larger than the inner diameter of the shaft hole 5b of the turbine housing 5.

The bearing member 45 includes one main body 45b through which the small diameter portion 37a is inserted. The main body 45b includes a cylindrical portion 45c, a flange 45d, and a tapered portion 45e. The cylindrical portion 45c has a cylindrical shape. One end of the cylindrical portion 45c is continuous with the tapered portion 45e, and the other end is continuous with the flange 45d. The cylindrical portion 45c has the tapered portion 45e at an end (hereinafter, referred to as the tip) opposite to the flange 45d. The cylindrical portion 45c faces the small diameter portion 37a in the radial direction of the shaft 37. The tapered portion 45e is arranged in the shaft hole 5b. The tapered portion 45e has an annular shape. The tapered portion 45e faces the tapered portion 37b in the axial direction of the shaft 37. Therefore, the bearing member 45 can receive a load in the radial direction of the shaft 37 (radial load) by the cylindrical portion 45c. The bearing member 45 can receive a load in the axial direction of the shaft 37 (axial load) by the tapered portion 45e.

The tapered portion 45e has an inner diameter that gradually increases in a direction away from the flange 45d. The smallest inner diameter of the tapered portion 45e is larger than the outer diameter of the small diameter portion 37a. The largest inner diameter of the tapered portion 45e is approximately equal to the largest outer diameter of the tapered portion 37b of the shaft 37. The tapered portion (counterface surface) 45e faces the tapered portion 37b of the shaft 37 in the axial direction.

The inner diameter of the cylindrical portion 45c has a constant inner diameter. The inner diameter of the cylindrical portion 45c is approximately equal to the smallest inner diameter of the tapered portion 45e. That is, the inner diameter of the cylindrical portion 45c is larger than the outer diameter of the small diameter portion 37a. The outer diameter of the cylindrical portion 45c is approximately equal to the largest outer diameter of the tapered portion 37b of the shaft 37. The outer diameter of the cylindrical portion 45c is smaller than the inner diameter of the shaft hole 5b.

The flange 45d is arranged in the external space S2 (outside the shaft hole 5b). The flange 45d has an annular shape. The flange 45d is continuous with the cylindrical portion 45c. The inner curved surface of the flange 45d is flush with the inner curved surface of the cylindrical portion 45c. However, the inner curved surface of the flange 45d may have a diameter smaller or larger than that of the inner curved surface of the cylindrical portion 45c. The outer diameter of the flange 45d is larger than the outer diameter of the cylindrical portion 45c. The outer diameter of the flange 45d is larger than the inner diameter of the shaft hole 5b.

Figure 9:
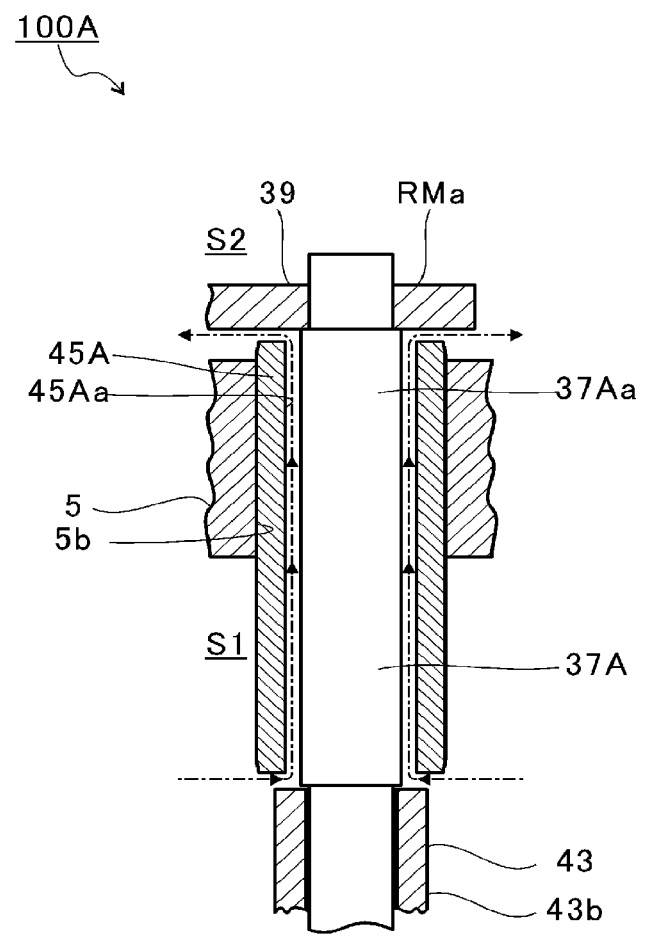
FIG. 9 is an explanatory diagram for explaining a structure of a bearing structure of a comparative example.

FIG. 9 is an explanatory diagram for explaining a structure of a bearing structure 100A of a comparative example. The bearing structure 100A includes a turbine housing 5, a rotation member RMa (link plate 39 and shaft 37A), and a bearing member 45A. The bearing structure 100A of the comparative example differs from the bearing structure 100 of the present embodiment in the structures of the shaft 37A and the bearing member 45A.

The bearing member 45A is press-fitted into a shaft hole 5b of the turbine housing 5. One end of the bearing member 45A is arranged in an internal space S1, and the other end is arranged in an external space S2. The bearing member 45A includes a bearing hole 45Aa. The bearing hole 45Aa communicates the internal space S1 with the external space S2. The bearing hole 45Aa has a constant inner diameter.

The shaft 37A has a small diameter portion 37Aa. The small diameter portion 37Aa is inserted into the bearing hole 45Aa. The small diameter portion 37Aa has a constant outer diameter. The outer diameter of the small diameter portion 37Aa is smaller than the inner diameter of the bearing hole 45Aa. That is, a gap is formed between the inner curved surface of the bearing member 45A and the outer curved surface of the small diameter portion 37Aa of the shaft 37A.

Exhaust gas flows in the internal space S1 of the turbine housing 5. At this point, the pressure in the internal space S1 is higher than the pressure in the external space S2 (for example, the atmospheric pressure). Therefore, according to the bearing structure 100A of the comparative example, exhaust gas leaks from the internal space S1 to the external space S2 through the gap between the bearing member 45A and the shaft 37A, as illustrated by a one-dot chain line in FIG. 9.

As illustrated in FIG. 8, the rotation member RM of the present embodiment includes the extended portion extending outward in the radial direction of the shaft 37. The bearing member 45 of the present embodiment includes a counterface surface that faces the extended portion in the axial direction. Specifically, the rotation member RM of the present embodiment includes the tapered portion (extended portion) 37b extending outward in the radial direction of the shaft 37. The bearing member 45 of the present embodiment includes the tapered portion (counterface surface) 45e that faces the tapered portion 37b in the axial direction.

The rotation member RM of the present embodiment includes a bottom surface (extended portion) 39c of the link plate 39 extending outward in the radial direction of the shaft 37. The bottom surface 39c is a plane the link plate 39 in the lower side in FIG. 8. The bearing member 45 of the present embodiment includes a top surface (counterface surface) 45da of the flange 45d facing the bottom surface 39c of the link plate 39 in the axial direction. The top surface 45da is a plane of the flange 45d in the upper side in FIG. 8.

That is, the rotation member RM of the present embodiment includes the plurality of extended portions (tapered portion 37b and bottom surface 39c) extending outward in the radial direction from the small diameter portion 37a and formed separated away from each other in the axial direction. The tapered portion 37b and the bottom surface 39c (a pair of extended portions) face each other in the axial direction of the small diameter portion 37a.

In the bearing member 45 of the present embodiment, the main body 45b includes counterface surfaces (tapered portion 45e and top surface 45da) that face one of a plurality of extended portions (tapered portion 37b and bottom surface 39c) in the axial direction. The bearing member 45 includes the main body 45b located between a pair of extended portions (tapered portion 37b and bottom surface 39c). The main body 45b includes a pair of counterface surfaces (tapered portion 45e and top surface 45da) facing a pair of extended portions (tapered portion 37b and bottom surface 39c, respectively).

In the present embodiment, exhaust gas presses the flange 37d of the shaft 37 in a direction closer to the turbine housing 5 when the pressure in the internal space S1 exceeds the pressure in the external space S2. When the flange 37d is pressed by the exhaust gas, the flange 37d approaches the inner curved surface of the turbine housing 5. With the flange 37d approaching the inner curved surface of the turbine housing 5, the gap between the flange 37d and the turbine housing 5 becomes narrower. Therefore, it becomes difficult for the exhaust gas to flow from the internal space S1 into the shaft hole 5b of the turbine housing 5.

However, even when the flange 37d approaches the inner curved surface of the turbine housing 5, a slight gap is formed between the flange 37d and the inner curved surface of the turbine housing 5. Therefore, the exhaust gas slightly flows into the gap between the turbine housing 5 and the flange 37d from the internal space S1. The exhaust gas that has flowed into the gap between the turbine housing 5 and the flange 37d flows into the shaft hole 5b.

The exhaust gas that has flowed into the shaft hole 5b passes through the gap between the shaft hole 5b and the large diameter portion 37c. The exhaust gas that has passed through the gap between the shaft hole 5b and the large diameter portion 37c passes through the gap between the tapered portion 45e of the bearing member 45 and the tapered portion 37b of the shaft 37.

The exhaust gas that has passed through the gap between the tapered portion 45e and the tapered portion 37b passes through the gap between the cylindrical portion 45c and the small diameter portion 37a. The exhaust gas that has passed through the gap between the cylindrical portion 45c and the small diameter portion 37a passes through the gap between the top surface 45da of the flange 45d and the bottom surface 39c of the link plate 39. The exhaust gas that has passed through the gap between the top surface 45da of the flange 45d and the bottom surface 39c of the link plate 39 finally flows out to the external space S2.

As described above, in the bearing structure 100 of the present embodiment, the exhaust gas passes through the gap between the tapered portion (extended portion) 37b and the tapered portion (counterface surface) 45e. The exhaust gas passes through the gap between the bottom surface (extended portion) 39c of the link plate 39 and the top surface (counterface surface) 45da of the flange 45d.

Therefore, the bearing structure 100 of the present embodiment can have a longer flow path length over which the exhaust gas flows, as compared with the bearing structure 100A of the comparative example. That is, in the bearing structure 100 of the present embodiment, it is possible to make the flow path length of exhaust gas longer as compared to a structure having no extended portions extending outward in the radial direction of the shaft 37 nor counterface surfaces facing the extended portions in the axial direction.

In the bearing structure 100 of the present embodiment, the direction of flow of exhaust gas changes when the exhaust gas flows into the gap between the shaft hole 5b and the large diameter portion 37c from the gap between the flange 37d and the turbine housing 5. The direction of flow of the exhaust gas changes when the exhaust gas flows into the gap between the tapered portion (extended portion) 37b and the tapered portion (counterface surface) 45e from the gap between the shaft hole 5b and the large diameter portion 37c. The direction of flow of the exhaust gas changes when the exhaust gas flows into the gap between the cylindrical portion 45c and the small diameter portion 37a from the gap between the tapered portion (extended portion) 37b and the tapered portion (counterface surface) 45e. The direction of flow of the exhaust gas changes when the exhaust gas flows into the gap between the top surface 45da and the bottom surface 39c from the gap between the cylindrical portion 45c and the small diameter portion 37a.

As described above, the bearing structure 100 of the present embodiment can increase the pressure loss of exhaust gas by changing the direction of the flow of the exhaust gas flowing through the shaft hole 5b. Therefore, the bearing structure 100 of the present embodiment can increase the pressure loss of exhaust gas as compared with the bearing structure 100A of the comparative example (that is, a structure that does not change the direction of flow of the exhaust gas).

As described above, the bearing structure 100 of the present embodiment can suppress (reduce) the amount of exhaust gas leaking from the internal space S1 to the external space S2 as compared with the bearing structure 100A of the comparative example.

The bearing member 45A of the comparative example is press-fitted into the shaft hole 5b of the turbine housing 5, whereas the bearing member 45 of the present embodiment is not press-fitted into the shaft hole 5b. That is, the outer curved surface of the bearing member 45 of the present embodiment is separated from the turbine housing 5 (inner curved surface of the shaft hole 5b). Therefore, a gap is formed between the bearing member 45 of the present embodiment and the turbine housing 5.

The bearing member 45 of the present embodiment is provided to the shaft hole 5b of the turbine housing 5 in a freely rotatable manner. The bearing member 45 of the present embodiment is provided so as to be movable with respect to the shaft hole 5b of the turbine housing 5 in the central axial direction of the shaft hole 5b (axial direction of the shaft 37). As a result, the bearing member 45 of the present embodiment floats in the shaft hole 5*b* of the turbine housing 5.

When the link plate 39 is driven by the driving mechanism D (see FIG. 2), force may act on the shaft 37 in a direction that causes the central axis to be inclined. When the central axis of the shaft 37 is inclined with respect to the central axis of the shaft hole 5*b*, the shaft 37 collides with the bearing member 45. The shaft 37 and the bearing member 45 may wear if they collide with each other. The shaft 37 and the bearing member 45 may generate noise if they collide with each other.

Therefore, the bearing member 45 of the present embodiment is structured to float in the shaft hole 5*b*. As a result, the relative speed and the load (contact pressure) of the shaft 37 and the bearing member 45 at the time of collision are reduced. The amount of wear of the shaft 37 and the bearing member 45 is reduced since the relative speed and the load (contact pressure) at the time of collision are reduced. The shaft 37 and the bearing member 45 generate less noise since the relative speed and the load (contact pressure) at the time of collision are reduced.

As described above, a gap is formed between the bearing member 45 of the present embodiment and the turbine housing 5. Here, in the bearing structure 100 of the present embodiment, the distance between the inner curved surface of the shaft hole 5*b* and the outer curved surface of the bearing member 45 is shorter than the distance between the inner curved surface of the bearing member 45 and the outer curved surface of the shaft 37 (small diameter portion 37*a*).

Figure 10:
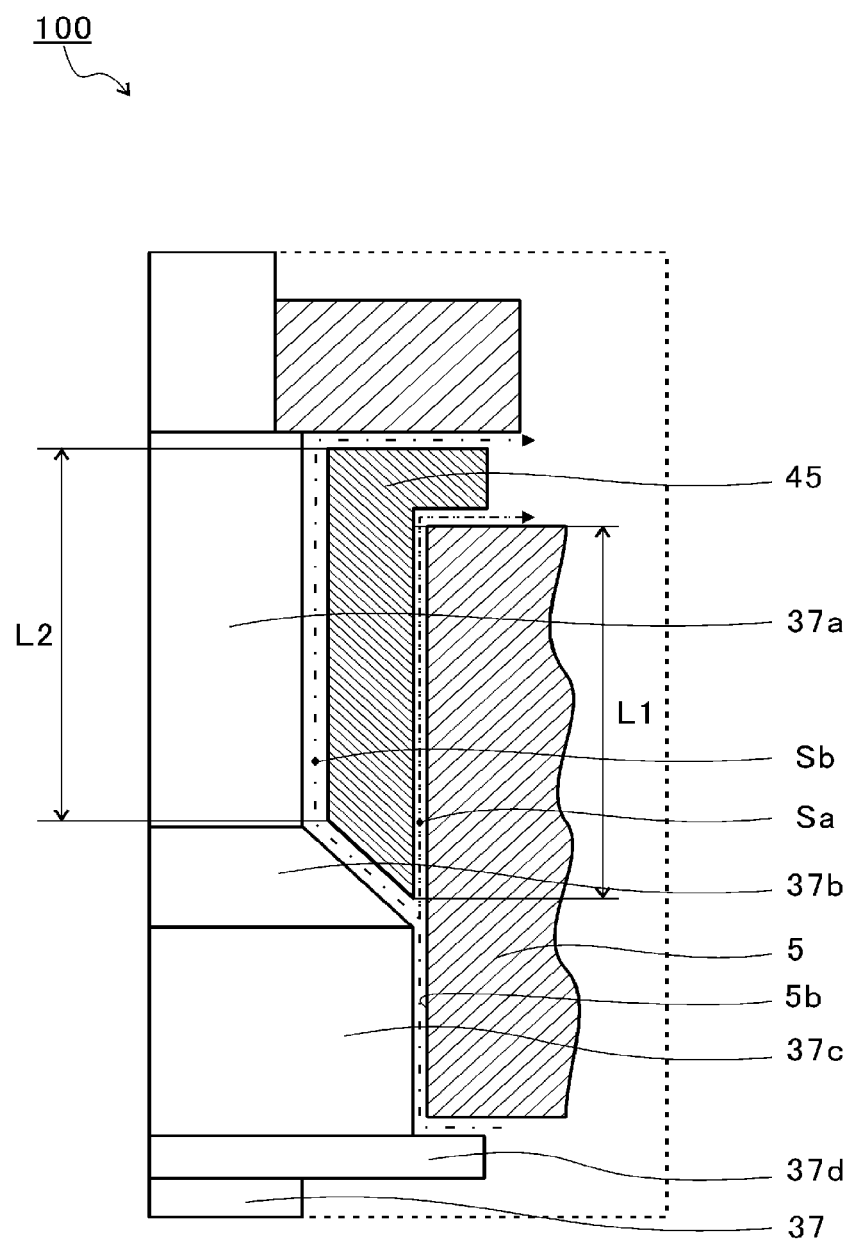
FIG. 10 is an explanatory diagram for explaining a flow path of exhaust gas.

FIG. 10 is an explanatory diagram for explaining a flow path of exhaust gas. FIG. 10 is a diagram of a broken line part extracted from FIG. 8. As illustrated in FIG. 10, the flow path cross section Sa between the inner curved surface of the shaft hole 5*b* and the outer curved surface of the bearing member 45 is smaller than the flow path cross section Sb between the inner curved surface of the bearing member 45 and the outer curved surface of the shaft 37 (small diameter portion 37*a*). That is, the relational expression of the flow path cross sections Sa and Sb is given by Sa<Sb.

By making the flow path cross section Sa smaller than the flow path cross section Sb, it becomes difficult for exhaust gas to flow in the gap (flow path) between the inner curved surface of the shaft hole 5*b* and the outer curved surface of the bearing member 45 as illustrated by a two-dot chain line in FIG. 10. As illustrated by a one-dot chain line in FIG. 10, it is easier for the exhaust gas to pass through the gap (flow path) between the inner curved surface of the bearing member 45 and the outer curved surface of the shaft 37 (small diameter portion 37*a*).

The difficulty for exhaust gas to flow varies depending on the length of a flow path (flow path length). The longer the flow path length is, the more difficult it becomes for the exhaust gas to flow. Here, as illustrated in FIG. 10, let L1 be the axial flow path length of the gap (flow path) between the inner curved surface of the shaft hole 5*b* and the outer curved surface of the bearing member 45. Let L2 be the axial flow path length of the gap (flow path) between the inner curved surface of the bearing member 45 and the outer curved surface of the shaft 37 (small diameter portion 37*a*).

At this point, a value obtained by dividing the flow path cross section Sa by the flow path length L1 (Sa/L1) is smaller than a value obtained by dividing the flow path cross section Sb by the flow path length L2 (Sb/L2). That is, the relational expression of the flow path cross sections Sa and Sb and the flow path lengths L1 and L2 is given by (Sa/L1)<(Sb/L2). By making the value (Sa/L1) smaller than the value (Sb/L2), the exhaust gas can flow more easily in the flow path illustrated by a one-dot chain line than in the flow path illustrated by a two-dot chain line in FIG. 10.

Figure 11:
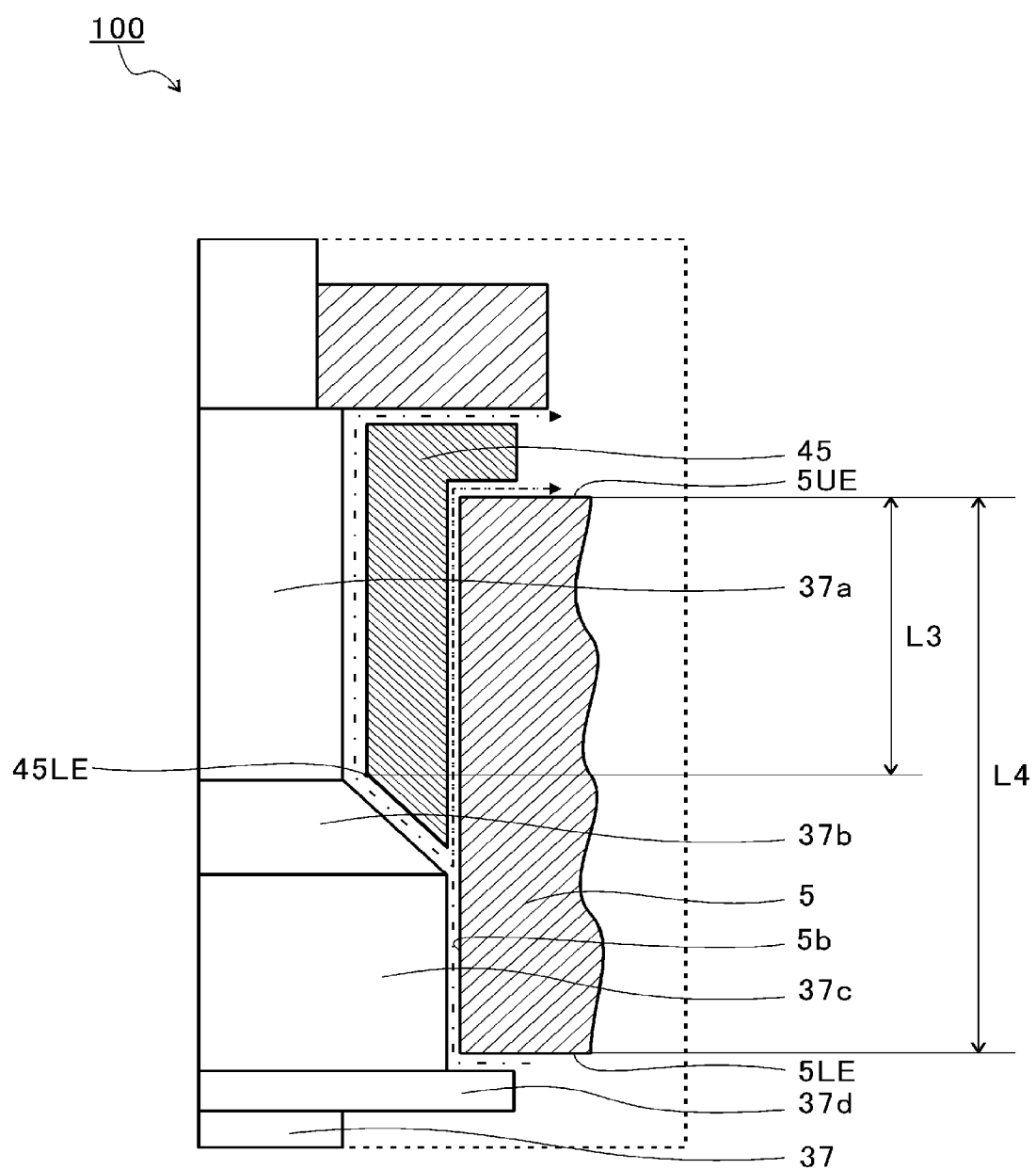
FIG. 11 is an explanatory diagram for explaining the axial lengths of a bearing member and a turbine housing.

FIG. 11 is an explanatory diagram for explaining the axial lengths of the bearing member 45 and the turbine housing 5. FIG. 11 is a diagram of a broken line part extracted from FIG. 8. As illustrated in FIG. 11, let L3 be the distance from an upper end 5UE of the turbine housing 5 in the axial direction of the shaft 37 to a lower end 45LE of the inner curved surface of the bearing member 45. Let L4 be the distance from the upper end 5UE of the turbine housing 5 to a lower end 5LE of the turbine housing 5 in the axial direction of the shaft 37 (that is, the wall thickness of the turbine housing 5).

At this point, the distance L3 has a length greater than or equal to a half of the distance L4. Since the distance L3 has a length greater than or equal to a half of the distance L4, the bearing member 45 can stably support the shaft 37 and thus the valve 27 (see FIG. 3).

Figure 12:
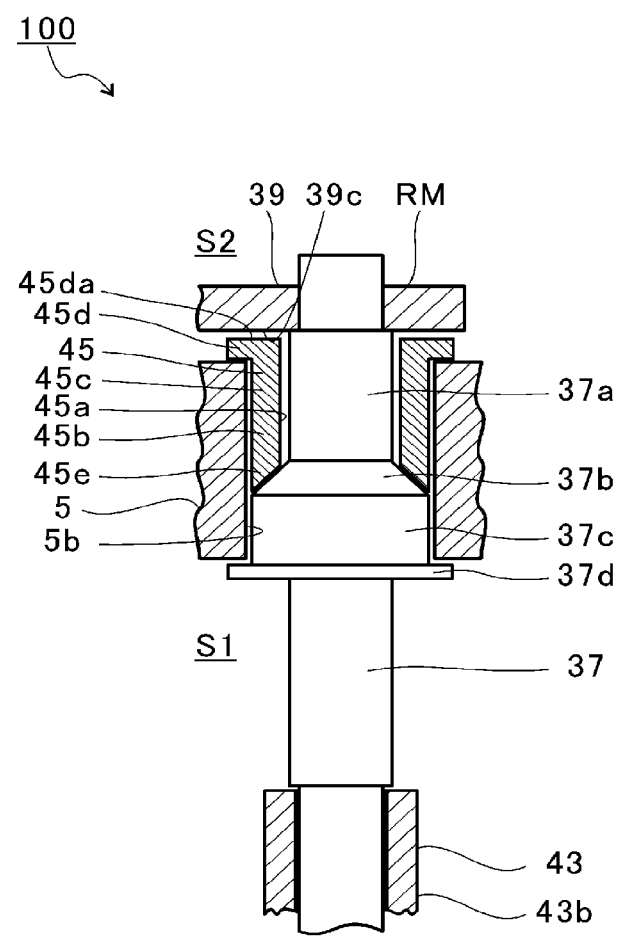
FIG. 12 is a diagram illustrating a state of the bearing member when the pressure of exhaust gas in the internal space is less than a predetermined pressure.

FIG. 12 is a diagram illustrating a state of the bearing member 45 when the pressure of exhaust gas in the internal space S1 is less than a predetermined pressure. As described above, the bearing member 45 of the present embodiment is not press-fitted into the shaft hole 5*b*. Therefore, the bearing member 45 of the present embodiment moves downward in the vertical direction (downward in FIG. 12) due to the gravity when the pressure of the exhaust gas in the internal space S1 is less than a predetermined pressure.

When the bearing member 45 moves downward in the vertical direction, the tapered portion (counterface surface) 45*e* of the bearing member 45 approaches the tapered portion (extended portion) 37*b* of the shaft 37. The shaft 37 is pressed toward the external space S2 (upward in the vertical direction) from the internal space S1 side by the pressure of the exhaust gas. The shaft 37 moves upward in the vertical direction (upward in FIG. 12) when pressed by the exhaust gas.

When the shaft 37 moves upward in the vertical direction, the tapered portion (extended portion) 37*b* of the shaft 37 approaches the tapered portion (counterface surface) 45*e* of the bearing member 45. As a result, the tapered portion (extended portion) 37*b* of the shaft 37 comes into contact with the tapered portion (counterface surface) 45*e* of the bearing member 45. With the tapered portion (counterface surface) 45*e* and the tapered portion (extended portion) 37*b* being in contact with each other, the gap between the bearing member 45 and the shaft 37 is sealed.

Furthermore, when the bearing member 45 moves downward in the vertical direction, the flange 45*d* of the bearing member 45 comes into contact with the upper end (outer surface) of the turbine housing 5. That is, with the flange 45*d* and the upper end of the turbine housing 5 being in contact with each other, the gap between the bearing member 45 and the turbine housing 5 is sealed.

As described above, the bearing structure 100 of the present embodiment can seal the gap between the bearing member 45 and the shaft 37 (bearing member 45 and the turbine housing 5) when the pressure of the exhaust gas in the internal space S1 is less than a predetermined pressure. Therefore, the bearing structure 100 of the present embodiment can suppress (reduce) the amount of exhaust gas leaking from the internal space S1 to the external space S2.

Figure 13:
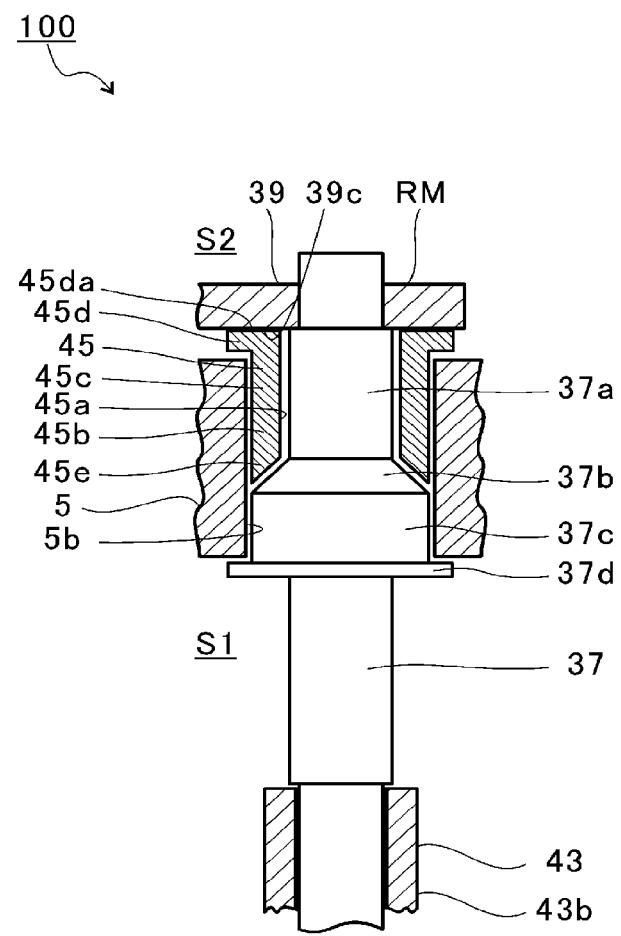
FIG. 13 is a diagram illustrating a state of the bearing member when the pressure of exhaust gas in the internal space is greater than or equal to the predetermined pressure.

FIG. 13 is a diagram illustrating a state of the bearing member 45 when the pressure of exhaust gas in the internal space S1 is greater than or equal to the predetermined pressure. The bearing member 45 of the present embodiment is pressed by the exhaust gas and moves upward in the vertical direction (upward in FIG. 13) when the pressure of the exhaust gas in the internal space S1 is higher than or equal to the predetermined pressure.

When the bearing member 45 moves upward in the vertical direction, the top surface (counterface surface) 45da of the flange 45d comes into contact with the bottom surface (extended portion) 39c of the link plate 39. That is, the top surface (counterface surface) 45da and the bottom surface (extended portion) 39c seal the gap between the bearing member 45 and the link plate 39.

As described above, the bearing structure 100 of the present embodiment can seal the gap between the bearing member 45 and the link plate 39 when the pressure of the exhaust gas in the internal space S1 is greater than or equal to a predetermined pressure. Therefore, the bearing structure 100 of the present embodiment can suppress (reduce) the amount of exhaust gas leaking from the internal space S1 to the external space S2.

First Modification

Figure 14:
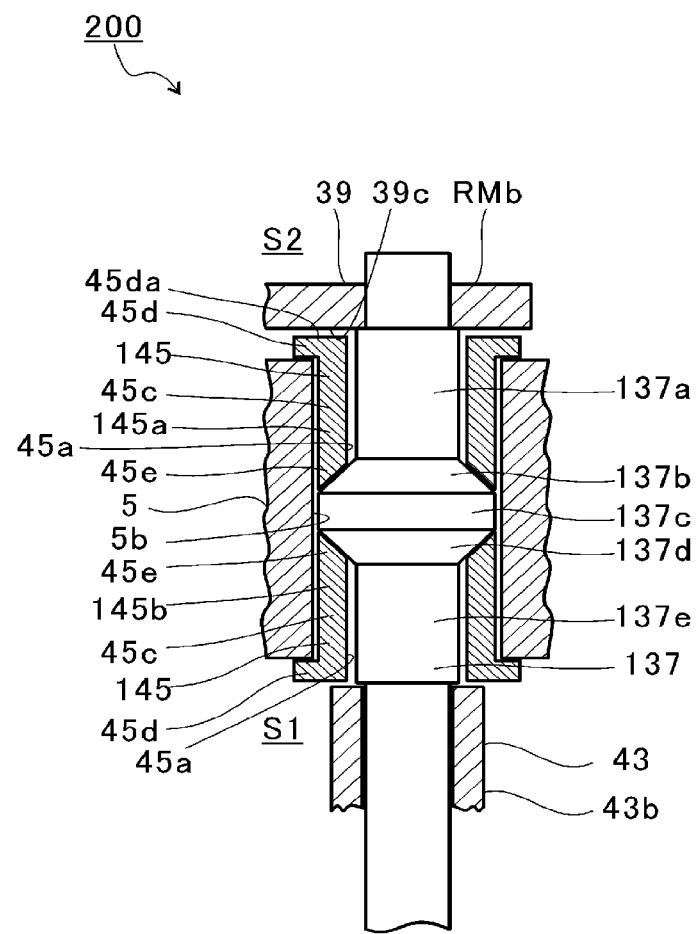
FIG. 14 is an explanatory diagram for explaining the structure of a bearing structure of a first modification.

FIG. 14 is an explanatory diagram for explaining the structure of a bearing structure 200 of a first modification. Components that are substantially the same as those of the turbocharger T of the above embodiment are denoted by the same symbol, and description thereof will be omitted. The bearing structure 200 of the first modification includes a rotation member RMb instead of the rotation member RM of the above embodiment. The rotation member RMb includes a link plate 39 and a shaft 137. Furthermore, the bearing structure 200 of the first modification includes a bearing member 145 instead of the bearing member 45 of the above embodiment.

As illustrated in FIG. 14, the shaft 137 of the first modification has a first small diameter portion (shaft portion) 137a, a first tapered portion (extended portion) 137b, a large diameter portion 137c, and a second tapered portion 137d, and a second small diameter portion (shaft portion) 137e.

The first small diameter portion 137a has a cylindrical shape. One end of the first small diameter portion 137a is coupled to the link plate 39, and the other end is continuous with the first tapered portion 137b. The first small diameter portion 137a has a constant outer diameter. The outer diameter of the first small diameter portion 137a is smaller than the inner diameter of a bearing hole 45a of the bearing member 145.

The first tapered portion (first extended portion) 137b has a truncated cone shape. One end of the first tapered portion 137b is continuous with the first small diameter portion 137a, and the other end is continuous with the large diameter portion 137c. The first tapered portion 137b has an outer diameter that gradually increases from the first small diameter portion 137a toward the large diameter portion 137c. The smallest outer diameter of the first tapered portion 137b is approximately equal to the outer diameter of the first small diameter portion 137a. That is, the smallest outer diameter of the first tapered portion 137b is smaller than the inner diameter of the bearing hole 45a of the bearing member 145. The largest outer diameter of the first tapered portion 137b is larger than the inner diameter of the bearing hole 45a of the bearing member 145.

The large diameter portion 137c has a cylindrical shape. One end of the large diameter portion 137c is continuous with the first tapered portion 137b, and the other end is continuous with the second tapered portion 137d. The large diameter portion 137c has a constant outer diameter. The outer diameter of the large diameter portion 137c is approximately equal to the largest outer diameter of the first tapered portion 137b. The outer diameter of the large diameter portion 137c is larger than the outer diameter of the first small diameter portion 137a. The outer diameter of the large diameter portion 137c is smaller than the inner diameter of a shaft hole 5b of the turbine housing 5.

The second tapered portion (second extended portion) 137d has a truncated cone shape. One end of the second tapered portion 137d is continuous with the large diameter portion 137c, and the other end is continuous with the second small diameter portion 137e. The second tapered portion 137d has an outer diameter that gradually decreases from the large diameter portion 137c toward the second small diameter portion 137e. The smallest outer diameter of the second tapered portion 137d is smaller than the inner diameter of the bearing hole 45a of the bearing member 145. The largest outer diameter of the second tapered portion 137d is larger than the inner diameter of the bearing hole 45a of the bearing member 145.

As described above, in the rotation member RMb of the first modification, the large diameter portion 137c includes extended portions (first tapered portion 137b and second tapered portion 137d) on one side and the other side of the shaft 137 in the axial direction.

The second small diameter portion 137e has a cylindrical shape. One end of the second small diameter portion 137e is continuous with the second tapered portion 137d, and the other end is arranged in the internal space S1 of the turbine housing 5. The second small diameter portion 137e has a constant outer diameter. The outer diameter of the second small diameter portion 137e is smaller than the inner diameter of the bearing hole 45a of the bearing member 145. The outer diameter of the second small diameter portion 137e is approximately equal to the outer diameter of the first small diameter portion 137a.

The bearing member 145 of the first modification includes a first main body 145a and a second main body 145b. The first main body 145a is inserted through the first small diameter portion 137a. The first main body 145a includes the cylindrical portion 45c, the flange 45d, and the tapered portion 45e of the above embodiment. The second main body 145b is inserted through the second small diameter portion 137e. The second main body 145b includes the cylindrical portion 45c, the flange 45d, and the tapered portion 45e of the above embodiment.

The first main body 145a is arranged on the first tapered portion 137b side (upper side in FIG. 14) with respect to the large diameter portion 137c. The second main body 145b is arranged on the second tapered portion 137d side (lower side in FIG. 14) with respect to the large diameter portion 137c. That is, the bearing member 145 of the first modification includes a plurality of main bodies (first main body 145a and second main body 145b) arranged on one side and the other side in the axial direction with respect to the large diameter portion 137c. The first main body 145a and the second main body 145b include a pair of tapered portions 45e (first counterface surface) and 45e (second counterface surface), respectively, arranged so as to face each other in the axial direction of the shaft 137. The tapered portion 45e of the first main body 145a faces the tapered portion 45e of the second main body 145b in the axial direction via the large diameter portion 137c.

As described in the above embodiment, the bearing member 145 (first main body 145a and second main body 145b) floats in the shaft hole 5b. The inner diameter of the second main body 145b is smaller than the outer diameter of a cylindrical portion 43b of an attachment plate 43. The cylindrical portion 43b of the attachment plate 43 can support the second main body 145b.

The rotation member RMb of the first modification includes a plurality of extended portions extending outward in the radial direction of the shaft 137. The bearing member 145 of the first modification includes a plurality of counterface surfaces facing the plurality of extended portions in the axial direction.

Specifically, the rotation member RMb of the first modification includes a first tapered portion (first extended portion) 137b and a second tapered portion (second extended portion 137d extending outward in the radial direction of the shaft 137. The bearing member 145 of the first modification includes a tapered portion (first counterface surface) 45e of the first main body 145a facing the first tapered portion 137b in the axial direction. The bearing member 145 of the first modification includes a tapered portion (second counterface surface) 45e of the second main body 145b facing the second tapered portion 137d in the axial direction.

In the first modification, exhaust gas presses the flange 45d of the second main body 145b in a direction closer to the turbine housing 5 when the pressure in the internal space S1 exceeds the pressure in the external space S2. When the flange 45d is pressed by the exhaust gas, the flange 45d approaches the inner curved surface of the turbine housing 5. With the flange 45d approaching the inner curved surface of the turbine housing 5, the gap between the flange 45d and the turbine housing 5 becomes narrower. Therefore, it becomes difficult for the exhaust gas to flow into the shaft hole 5b through the gap between the flange 45d and the turbine housing 5.

However, when the flange 45d approaches the inner curved surface of the turbine housing 5, a slight gap is formed between the flange 45d and the cylindrical portion 43b of the attachment plate 43. Therefore, the exhaust gas slightly flows into the gap between the second main body 145b and the second small diameter portion 137e from the internal space S1. The exhaust gas that has flowed into the gap between the second main body 145b and the second small diameter portion 137e passes through the gap between the second tapered portion 137d and the tapered portion 45e of the second main body 145b.

The exhaust gas that has passed through the gap between the second tapered portion 137d and the tapered portion 45e of the second main body 145b passes through the gap between the shaft hole 5b and the large diameter portion 137c. The exhaust gas that has passed through the gap between the shaft hole 5b and the large diameter portion 137c passes through the gap between the first tapered portion 137b and the tapered portion 45e of the first main body 145a.

The exhaust gas that has passed through the gap between the first tapered portion 137b and the tapered portion 45e of the first main body 145a passes through the gap between the first small diameter portion 137a and the first main body 145a. The exhaust gas that has passed through the gap between the first small diameter portion 137a and the first main body 145a passes through the gap between a top surface 45da of the flange 45d of the first main body 145a and a bottom surface 39c of the link plate 39. The exhaust gas that has passed through the gap between the top surface 45da of the flange 45d and the bottom surface 39c of the link plate 39 flows out to the external space S2.

As described above, in the bearing structure 200 of the first modification, the exhaust gas passes through the gap between the first tapered portion (first extended portion) 137b and the tapered portion (first counterface surface) 45e of the first main body 145a. The exhaust gas passes through the gap between the second tapered portion (second extended portion) 137d and the tapered portion (second counterface surface) 45e of the second main body 145b.

Therefore, the bearing structure 200 of the first modification can have a longer flow path length over which the exhaust gas flows, as compared with the bearing structure 100A of the comparative example. That is, in the bearing structure 200, it is possible to make the flow path length of exhaust gas longer as compared to a structure having no extended portions (first extended portion, second extended portion) extending outward in the radial direction of the shaft 137 nor counterface surfaces (first counterface surface, second counterface surface) facing the extended portions in the axial direction.

In the bearing structure 200 of the first modification, the direction of flow of the exhaust gas changes when flowing through the gap between the first tapered portion 137b and the tapered portion 45e of the first main body 145a. The direction of flow of the exhaust gas changes also when flowing through the gap between the second tapered portion 137d and the tapered portion 45e of the second main body 145b. The direction of flow of the exhaust gas changes when flowing through the gap between the top surface 45da of the flange 45d of the first main body 145a and the bottom surface 39c of the link plate 39.

In this manner, by changing the direction of the flow of the exhaust gas flowing through the shaft hole 5b, the pressure loss of the exhaust gas can be increased. Therefore, the bearing structure 200 of the first modification can increase the pressure loss of exhaust gas as compared with the bearing structure 100A of the comparative example (that is, a structure that does not change the direction of flow of the exhaust gas).

As described above, the bearing structure 200 of the first modification can suppress (reduce) the amount of exhaust gas leaking from the internal space S1 to the external space S2 as compared with the bearing structure 100A of the comparative example. Note that, as described in the above embodiment, the flow path cross sections Sa and Sb and the flow path lengths L1 and L2 have the above-mentioned relationship.

Therefore, it is difficult for the exhaust gas to flow through the gap between the outer curved surface of the bearing member 145 and the inner curved surface of the shaft hole 5b of the turbine housing 5. It is easier for the exhaust gas to pass through the gap between the inner curved surface of the bearing member 145 and the outer curved surface of the shaft 137 (first small diameter portion 137a and second small diameter portion 137e).

Second Modification

Figure 15:
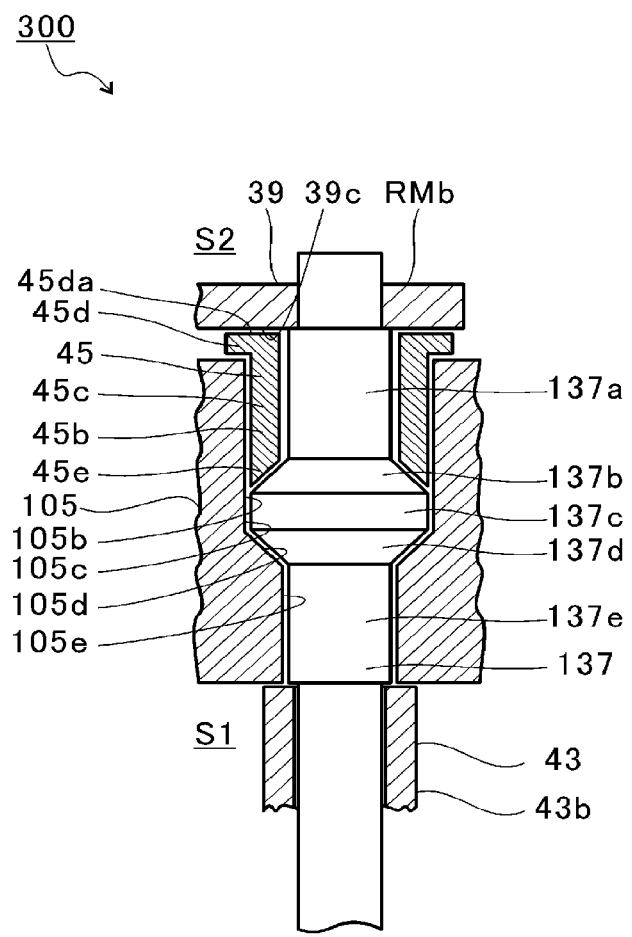
FIG. 15 is an explanatory diagram for explaining the structure of a bearing structure of a second modification.

FIG. 15 is an explanatory diagram for explaining the structure of a bearing structure 300 of a second modification. Components that are substantially the same as those of the turbocharger T of the first modification are denoted by the same symbol, and description thereof will be omitted. The bearing structure 300 of the second modification includes a rotation member RMb of the first modification instead of the rotation member RM of the above embodiment. Furthermore, the bearing structure 300 of the second modification includes a turbine housing 105 instead of the turbine housing 5 of the above embodiment.

As illustrated in FIG. 15, the turbine housing 105 of the second modification includes a shaft hole 105b. The shaft hole 105b includes a large diameter hole 105c, a reduced diameter hole 105d, and a small diameter hole 105e.

The large diameter hole 105c has a round cross section orthogonal to the axial direction. One end of the large diameter hole 105c opens in an external space S2, and the other end is continuous with the reduced diameter hole 105d. The large diameter hole 105c has a constant inner diameter. The inner diameter of the large diameter hole 105c is larger than the outer diameter of a cylindrical portion 45c of a bearing member 45. The inner diameter of the large diameter hole 105c is larger than the outer diameter of a large diameter portion 137c of a shaft 137.

The reduced diameter hole 105d has a round cross section orthogonal to the axial direction. One end of the reduced diameter hole 105d is continuous with the large diameter hole 105c, and the other end is continuous with the small diameter hole 105e. The reduced diameter hole 105d has a tapered shape in which the inner diameter gradually decreases from the large diameter hole 105c toward the small diameter hole 105e. The largest inner diameter of the reduced diameter hole 105d is larger than the largest outer diameter of the second tapered portion 137d. The smallest inner diameter of the reduced diameter hole 105d is smaller than the largest outer diameter of the second tapered portion 137d.

The small diameter hole 105e has a round cross section orthogonal to the axial direction. One end of the small diameter hole 105e is continuous with the reduced diameter hole 105d, and the other end is opened in the internal space S1. The small diameter hole 105e has a constant inner diameter. The inner diameter of the small diameter hole 105e is larger than the outer diameter of the second small diameter portion 137e. The inner diameter of the small diameter hole 105e is smaller than the largest outer diameter of the second tapered portion 137d.

The rotation member RMb of the second modification includes an extended portion extending outward in the radial direction of the shaft 137. The bearing member 45 of the second modification includes a counterface surface that faces the extended portion in the axial direction.

Specifically, the rotation member RMb of the second modification has a first tapered portion (extended portion) 137b extending outward in the radial direction of the shaft 137. The bearing member 45 of the second modification has a tapered portion (counterface surface) 45e that faces the first tapered portion 137b in the axial direction.

The rotation member RMb of the second modification has a bottom surface (extended portion) 39c of a link plate 39 extending outward in the radial direction of the shaft 137. The bearing member 45 of the second modification has a top surface (counterface surface) 45da of a flange 45d that faces the bottom surface 39c of the link plate 39 in the axial direction.

The rotation member RMb of the second modification has the second tapered portion 137d extending outward in the radial direction of the shaft 137. The turbine housing 105 of the second modification has the reduced diameter hole 105d that faces the second tapered portion 137d in the axial direction.

In the bearing structure 300 of the second modification, the exhaust gas passes through the gap between the first tapered portion (extended portion) 137b and the tapered portion (counterface surface) 45e. The exhaust gas passes through the gap between the second tapered portion 137d and the reduced diameter hole 105d. The exhaust gas passes through the gap between the bottom surface (extended portion) 39c of the link plate 39 and the top surface (counterface surface) 45da of the flange 45d.

Therefore, the bearing structure 300 of the second modification can have a longer flow path length over which the exhaust gas flows, as compared with the bearing structure 100A of the comparative example. That is, in the bearing structure 300, it is possible to make the flow path length of exhaust gas longer as compared to a structure having no extended portions extending outward in the radial direction of the shaft 137 nor counterface surfaces facing the extended portions in the axial direction.

In the bearing structure 300 of the second modification, the direction of flow of the exhaust gas changes when flowing through the gap between the first tapered portion 137b and the tapered portion 45e of the bearing member 45. The direction of flow of the exhaust gas changes when flowing through the gap between the second tapered portion 137d and the reduced diameter hole 105d. The direction of flow of the exhaust gas changes when flowing through the gap between the top surface 45da of the flange 45d and the bottom surface 39c of the link plate 39.

In this manner, by changing the direction of the flow of the exhaust gas flowing through the shaft hole 5b, the pressure loss of the exhaust gas can be increased. Therefore, the bearing structure 300 of the second modification can increase the pressure loss of exhaust gas as compared with the bearing structure 100A of the comparative example (that is, a structure that does not change the direction of flow of the exhaust gas).

As described above, the bearing structure 300 of the second modification can suppress (reduce) the amount of exhaust gas leaking from the internal space S1 to the external space S2 as compared with the bearing structure 100A of the comparative example. Note that, as described in the above embodiment, the flow path cross sections Sa and Sb and the flow path lengths L1 and L2 have the above-mentioned relationship.

Therefore, it is difficult for the exhaust gas to flow through the gap between the outer curved surface of the bearing member 45 and the inner curved surface of the shaft hole 105b of the turbine housing 5. It is easier for the exhaust gas to pass through the gap between the inner curved surface of the bearing member 45 and the outer curved surface of the shaft 137 (first small diameter portion 137a).

Third Modification

Figure 16:
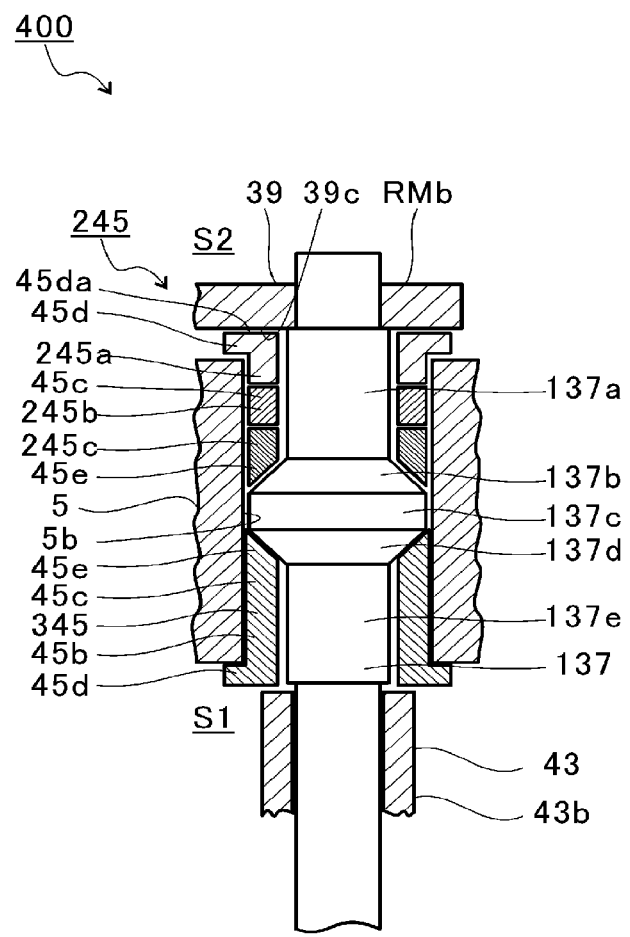
FIG. 16 is an explanatory diagram for explaining the structure of a bearing structure of a third modification.

FIG. 16 is an explanatory diagram for explaining the structure of a bearing structure 400 of a third modification. Components that are substantially the same as those of the turbocharger T of the first modification are denoted by the same symbol, and description thereof will be omitted. The bearing structure 400 of the third modification includes a rotation member RMb of the first modification instead of the rotation member RM of the above embodiment. Furthermore, the bearing structure 400 of the third modification includes a bearing member 245 instead of the bearing member 45 of the above embodiment. The bearing member 245 includes main bodies 245a, 245b, and 245c that include a plurality of members divided in the axial direction. The bearing structure 400 of the third modification includes a positioning bearing member 345 press-fitted into a shaft hole 5b of a turbine housing 5.

As illustrated in FIG. 16, the bearing structure 400 of the third modification includes the bearing member 245 and the positioning bearing member 345. The bearing member 245 is not press-fitted into the shaft hole 5b of the turbine housing 5. The bearing member 245 is freely rotatable with respect to the shaft hole 5b of the turbine housing 5. The bearing member 245 is movable with respect to the shaft hole 5b of the turbine housing 5 in the central axial direction of the shaft hole 5b (axial direction of a shaft 137).

The bearing member 245 includes the plurality of members (main bodies 245a, 245b, and 245c) through which the first small diameter portion 137a is inserted. The bearing member 245 has a shape obtained by dividing the bearing member 45 of the above embodiment in the axial direction. The main body 245a includes a part of the flange 45d and the cylindrical portion 45c of the bearing member 45 of the above embodiment. The main body 245b includes a part of the cylindrical portion 45c of the bearing member 45 of the above embodiment. The main body 245c includes a part of the cylindrical portion 45c and the tapered portion 45e of the bearing member 45 of the above embodiment.

By dividing the bearing member 45 of the above embodiment into the main bodies 245a, 245b, and 245c, it becomes possible for the exhaust gas to pass through the gap between the main body 245a and the main body 245b and between the main body 245b and the main body 245c. This complicates the flow paths of exhaust gas. Complicating the flow paths of exhaust gas increases the number of times the direction of flow of the exhaust gas flowing in the shaft hole 5b is changed. By increasing the number of times the direction of flow of exhaust gas is changed, the pressure loss of the exhaust gas can be increased.

The positioning bearing member 345 includes the main body 45b, the cylindrical portion 45c, the flange 45d, and the tapered portion 45e of the bearing member 45 of the above embodiment. Note that the positioning bearing member 345 is press-fitted into the shaft hole 5b of the turbine housing 5. That is, the outer curved surface of the positioning bearing member 345 is in contact with the inner curved surface of the shaft hole 5b.

Therefore, the positioning bearing member 345 cannot rotate with respect to the shaft hole 5b of the turbine housing 5. The positioning bearing member 345 is immovable with respect to the shaft hole 5b of the turbine housing 5 in the central axial direction of the shaft hole 5b (axial direction of the shaft 137). That is, movement of the positioning bearing member 345 (main body 45b) in the axial direction of the shaft 137 is restricted.

The positioning bearing member 345 can support the second tapered portion 137d of the shaft 137 via the tapered portion 45e. Therefore, in the bearing structure 400 of the third modification, the positioning of the shaft 137 can be facilitated by adjusting the press-fitting position of the positioning bearing member 345. With the shaft 137 positioned, the ease of assembly of the bearing structure 400 can be improved. Specifically, with the shaft 137 positioned, a worker can easily attach (for example, weld) the attachment plate 43 to the shaft 137. With the shaft 137 positioned, a worker can easily attach (for example, weld) a link plate 39 to the shaft 137.

The rotation member RMb of the third modification includes an extended portion extending outward in the radial direction of the shaft 137. The bearing member 245 of the third modification includes a counterface surface that faces the extended portion in the axial direction.

Specifically, the rotation member RMb of the third modification has a first tapered portion (extended portion) 137b extending outward in the radial direction of the shaft 137. The bearing member 245 of the third modification also has a tapered portion (counterface surface) 45e that faces the first tapered portion 137b in the axial direction.

The rotation member RMb of the third modification has a bottom surface (extended portion) 39c of the link plate 39 extending outward in the radial direction of the shaft 137. The bearing member 245 of the third modification has a top surface (counterface surface) 45da of the flange 45d facing a bottom surface 39c of the link plate 39 in the axial direction.

The rotation member RMb of the third modification has the second tapered portion 137d extending outward in the radial direction of the shaft 137. The positioning bearing member 345 of the third modification has the tapered portion 45e that faces the second tapered portion 137d in the axial direction.

In the bearing structure 400 of the third modification, the exhaust gas passes through the gap between the first tapered portion (extended portion) 137b and the tapered portion (counterface surface) 45e. The exhaust gas passes through the gap between the second tapered portion 137d and the tapered portion 45e. The exhaust gas passes through the gap between the bottom surface (extended portion) 39c of the link plate 39 and the top surface (counterface surface) 45da of the flange 45d.

Therefore, the bearing structure 400 of the third modification can have a longer flow path length over which the exhaust gas flows, as compared with the bearing structure 100A of the comparative example. That is, in the bearing structure 400, it is possible to make the flow path length of exhaust gas longer as compared to a structure having no extended portions extending outward in the radial direction of the shaft 137 nor counterface surfaces facing the extended portions in the axial direction.

In the bearing structure 400 of the third modification, the direction of flow of the exhaust gas changes when flowing through the gap between the first tapered portion 137b and the main body 245c. The direction of flow of the exhaust gas changes when flowing through the gap between the second tapered portion 137d and the flange 45d of the positioning bearing member 345. The direction of flow of the exhaust gas changes when flowing through the gap between the top surface 45da of the flange 45d and the bottom surface 39c of the link plate 39.

The direction of flow of the exhaust gas changes when flowing through the gap between the main body 245a and the main body 245b. The direction of flow of the exhaust gas changes when flowing through the gap between the main body 245b and the main body 245c.

In this manner, by changing the direction of the flow of the exhaust gas flowing through the shaft hole 5b, the pressure loss of the exhaust gas can be increased. Therefore, the bearing structure 400 of the third modification can increase the pressure loss of exhaust gas as compared with the bearing structure 100A of the comparative example (that is, a structure that does not change the direction of flow of the exhaust gas).

As described above, the bearing structure 400 of the third modification can suppress (reduce) the amount of exhaust gas leaking from the internal space S1 to the external space S2 as compared with the bearing structure 100A of the comparative example. Note that, as described in the above embodiment, the flow path cross sections Sa and Sb and the flow path lengths L1 and L2 have the above-mentioned relationship.

Therefore, it is difficult for the exhaust gas to flow through the gap between the outer curved surfaces of the main bodies 245a, 245b, and 245c and the inner curved surfaces of the shaft hole 5b of the turbine housing 5. It is easier for the exhaust gas to pass through the gap between the inner curved surface of the main bodies 245*a*, 245*b*, and 245*c* and the outer curved surface of the shaft 137 (first small diameter portion 137*a*).

Although the embodiment of the present disclosure has been described with reference to the accompanying drawings, it is naturally understood that the present disclosure is not limited to the above embodiment. It is clear that those skilled in the art can conceive various modifications or variations within the scope described in the claims, and it is understood that they are naturally also within the technical scope of the present disclosure.

In the above-described embodiment and modifications, the bearing structures 100, 200, 300, and 400 for operating a valve 27 that opens and closes an outlet end 41*a* of a bypass flow path 41 have been described. However, the present disclosure is not limited thereto, and the bearing structures 100, 200, 300, and 400 may be applied to a bearing structure for pivotally supporting another shaft penetrating through the inside and outside of the housing of the turbocharger T.

For example, the bearing structures 100, 200, 300, and 400 may be applied to a bearing structure of a twin scroll type turbocharger. In this case, the bearing structures 100, 200, 300, and 400 may operate a valve that opens and closes a communication hole that communicates two turbine scroll flow passages.

The bearing structures 100, 200, 300 and 400 may be applied to a bearing structure of a series-type multi-stage turbocharger in which a low-pressure stage and a high-pressure stage turbocharger are connected in series to an exhaust manifold of an engine. The bearing structures 100, 200, 300 and 400 may be applied to a bearing structure of a parallel-type multi-stage turbocharger in which a plurality of turbochargers is connected in parallel to an exhaust manifold of an engine. In this case, the bearing structures 100, 200, 300, and 400 may operate an adjusting member for adjusting the flow rate of exhaust gas flowing into one turbine housing of a turbocharger included in a multi-stage turbocharger.

The bearing structures 100, 200, 300, and 400 may be applied to a bearing structure of a variable stator vane mechanism in which the communication opening between a turbine scroll flow passage and a discharge port is variable. In this case, the bearing structures 100, 200, 300, and 400 may operate a rotation member that rotates a nozzle vane of the variable stator vane mechanism.

In the above-described embodiment and modifications, the structures in which the bearing members 45, 145, and 245 floating in the shaft holes 5*b* pivotally support the shafts 37 and 137 provided with the extended portions have been described. However, the present disclosure is not limited thereto, and the bearing members 45, 145, and 245 floating in the shaft holes 5*b* may pivotally support a shaft having no extended portions. For example, the bearing members 45, 145, and 245 floating in the shaft holes 5*b* may pivotally support a straight shaft having a constant outer diameter (hereinafter, simply referred to as a straight shaft).

Here, in a case where the shaft (straight shaft) is rotationally driven by the driving mechanism, a force may act on the shaft in a direction that causes the central axis to be inclined. The shaft collides with a bearing member when the central axis thereof is inclined with respect to the central axis of a shaft hole of a turbine housing. At this point, in a case where the bearing member is press-fitted into the turbine housing, the shaft and the bearing member may generate wear and noise when they collide with each other.

Therefore, the bearing members 45, 145, and 245 are provided to the shaft hole 5*b* of the turbine housing 5 in a freely rotatable manner. Furthermore, the bearing members 45, 145, and 245 are provided so as to be movable with respect to the shaft hole 5*b* of the turbine housing 5 in the central axial direction of the shaft hole 5*b* (axial direction of the straight shaft).

That is, the bearing members 45, 145, and 245 pivotally support the straight shaft and float in the shaft hole 5*b*. As a result, the relative speed and the load (contact pressure) of the straight shaft and the bearing members 45, 145, and 245 at the time of collision are reduced. The amount of wear of the straight shaft and the bearing members 45, 145, and 245 is reduced since the relative speed and the load (contact pressure) at the time of collision are reduced. The noise generated by the straight shaft and the bearing members 45, 145, and 245 is reduced since the relative speed and the load (contact pressure) at the time of collision are reduced.

INDUSTRIAL APPLICABILITY

The present disclosure is applicable to a bearing structure.

What is claimed is:

1. A bearing structure comprising:
   a rotation member including a shaft portion and a plurality of extended portions extending radially outward from the shaft portion and arranged separated away from each other in an axial direction of the shaft portion;
   a large diameter portion having a diameter larger than a diameter of the shaft portion and including the extended portion on each of one side and another side in the axial direction, the large diameter portion being included in the rotation member;
   a bearing member including a plurality of main bodies through which the shaft portion is inserted, the plurality of main bodies being arranged on each of one side and another side in the axial direction with respect to the large diameter portion, the plurality of main bodies including a counterface surface facing one of the plurality of extended portions in the axial direction; and
   a turbine housing in which a through hole is formed, the through hole in which the bearing member is arranged,
   wherein the plurality of main bodies includes a first main body floating in the through hole, the first main body including a first flange facing an inner curved surface of the turbine housing in the axial direction, and
   wherein the first flange approaches the inner curved surface of the turbine housing when a pressure in an internal space in the turbine housing exceeds a predetermined pressure.

2. The bearing structure according to claim 1, wherein the rotation member includes a pair of the extended portions arranged so as to face each other in the axial direction.

3. The bearing structure according to claim 1, wherein the bearing member includes one of the plurality of main bodies located between a pair of the extended portions arranged so as to face each other in the axial direction, the one of the plurality of main bodies including a pair of counterface surfaces facing the pair of extended portions, respectively.

4. The bearing structure according to claim 2, wherein the bearing member includes one of the plurality of main bodies located between a pair of the extended portions arranged so as to face each other in the axial direction, the one of the plurality of main bodies including a pair of counterface surfaces facing the pair of extended portions, respectively.

5. The bearing structure according to claim 1, wherein the bearing member includes a pair of the counterface surfaces arranged so as to face each other in the axial direction.

6. The bearing structure according to claim 2, wherein the bearing member includes a pair of the counterface surfaces arranged so as to face each other in the axial direction.

7. The bearing structure according to claim 3, wherein the bearing member includes a pair of the counterface surfaces arranged so as to face each other in the axial direction.

8. The bearing structure according to claim 4, wherein the bearing member includes a pair of the counterface surfaces arranged so as to face each other in the axial direction.

9. The bearing structure according to claim 1, wherein the bearing member includes one of the plurality of main bodies arranged so as to be movable in the axial direction and another one of the plurality of main bodies whose movement in the axial direction is restricted.

10. The bearing structure according to claim 2, wherein the bearing member includes one of the plurality of main bodies arranged so as to be movable in the axial direction and another one of the plurality of main bodies whose movement in the axial direction is restricted.

11. The bearing structure according to claim 3, wherein the bearing member includes one of the plurality of main bodies arranged so as to be movable in the axial direction and another one of the plurality of main bodies whose movement in the axial direction is restricted.

12. The bearing structure according to claim 4, wherein the bearing member includes one of the plurality of main bodies arranged so as to be movable in the axial direction and another one of the plurality of main bodies whose movement in the axial direction is restricted.

13. The bearing structure according to claim 5, wherein the bearing member includes one of the plurality of main bodies arranged so as to be movable in the axial direction and another one of the plurality of main bodies whose movement in the axial direction is restricted.

14. The bearing structure according to claim 6, wherein the bearing member includes one of the plurality of main bodies arranged so as to be movable in the axial direction and another one of the plurality of main bodies whose movement in the axial direction is restricted.

15. The bearing structure according to claim 7, wherein the bearing member includes one of the plurality of main bodies arranged so as to be movable in the axial direction and another one of the plurality of main bodies whose movement in the axial direction is restricted.

16. The bearing structure according to claim 8, wherein the bearing member includes one of the plurality of main bodies arranged so as to be movable in the axial direction and another one of the plurality of main bodies whose movement in the axial direction is restricted.

17. The bearing structure according to claim 1, wherein the bearing member includes one of the plurality of main bodies including a plurality of members divided in the axial direction.

18. The bearing structure according to claim 1, wherein the plurality of extended portions includes a link plate arranged outside the turbine housing,
wherein the plurality of main bodies includes a second main body floating in the through hole, the second main body including a second flange facing the link plate in the axial direction, and
wherein the second flange comes in contact with the link plate when the pressure in the internal space in the turbine housing exceeds the predetermined pressure.

* * * * *